United States Patent
Goodsitt et al.

(10) Patent No.: US 10,339,530 B1
(45) Date of Patent: Jul. 2, 2019

(54) TOUCH AUTHENTICATION OF MULTIPLE USERS OR OPERATING MODES FOR A TRANSACTION CARD

(71) Applicant: Capital One Services, LLC, McLean, VA (US)

(72) Inventors: Jeremy Goodsitt, McLean, VA (US); Austin Walters, McLean, VA (US); Fardin Abdi Taghi Abad, McLean, VA (US); Reza Farivar, McLean, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/281,802

(22) Filed: Feb. 21, 2019

(51) Int. Cl.
G06Q 20/40 (2012.01)
G06Q 20/34 (2012.01)
G06F 3/041 (2006.01)

(52) U.S. Cl.
CPC ........... *G06Q 20/409* (2013.01); *G06F 3/041* (2013.01); *G06Q 20/341* (2013.01); *G06Q 20/354* (2013.01)

(58) Field of Classification Search
USPC .................................................... 705/35–45
See application file for complete search history.

(56) References Cited

U.S. PATENT DOCUMENTS

| | | | |
|---|---|---|---|
| 7,784,687 B2 | 8/2010 | Mullen | |
| 7,793,851 B2 | 9/2010 | Mullen | |
| 7,828,220 B2 | 11/2010 | Mullen | |
| 7,931,195 B2 | 4/2011 | Mullen | |
| 7,954,705 B2 | 6/2011 | Mullen | |
| D643,063 S | 8/2011 | Mullen et al. | |
| 8,011,577 B2 | 9/2011 | Mullen | |
| 8,020,775 B2 | 9/2011 | Mullen | |
| 8,066,191 B1 | 11/2011 | Cloutier | |
| D651,237 S | 12/2011 | Mullen et al. | |
| D651,238 S | 12/2011 | Mullen et al. | |
| 8,074,877 B2 | 12/2011 | Mullen | |
| D651,644 S | 1/2012 | Mullen et al. | |

(Continued)

OTHER PUBLICATIONS

Ullmann et al., "SCUIDSim: A Platform for Smart Card User Interface Research, Development and Testing", 2014, 6 pages.

(Continued)

*Primary Examiner* — Robert R Niquette
(74) *Attorney, Agent, or Firm* — Harrity & Harrity, LLP

(57) ABSTRACT

A transaction card receives a first input containing a first touch sequence from a first user and including first touch gestures, determines that the first touch sequence corresponds to a first reference touch sequence associated with the first user, and initiates a first operating mode, associated with the first touch sequence, that is associated with the first user and causes the transaction card to perform a first function. The transaction card receives a second input containing a second touch sequence that is different from the first touch sequence, from a second user and including second touch gestures, and initiates, based on determining that the second touch sequence corresponds to a second reference touch sequence, a second operating mode, associated with the second touch sequence, that is associated with the second user and causes the transaction card to perform a second function that is different from the first function.

20 Claims, 7 Drawing Sheets

(56) References Cited

U.S. PATENT DOCUMENTS

| | | |
|---|---|---|
| D652,075 S | 1/2012 | Mullen et al. |
| D652,076 S | 1/2012 | Mullen et al. |
| D652,448 S | 1/2012 | Mullen et al. |
| D652,449 S | 1/2012 | Mullen et al. |
| D652,450 S | 1/2012 | Mullen et al. |
| D652,867 S | 1/2012 | Mullen et al. |
| D653,288 S | 1/2012 | Mullen et al. |
| 8,172,148 B1 | 5/2012 | Cloutier |
| D665,022 S | 8/2012 | Mullen et al. |
| D665,447 S | 8/2012 | Mullen et al. |
| D666,241 S | 8/2012 | Mullen et al. |
| 8,282,007 B1 | 10/2012 | Cloutier |
| 8,286,876 B2 | 10/2012 | Mullen |
| D670,329 S | 11/2012 | Mullen et al. |
| D670,330 S | 11/2012 | Mullen et al. |
| D670,331 S | 11/2012 | Mullen et al. |
| D670,332 S | 11/2012 | Mullen et al. |
| D670,759 S | 11/2012 | Mullen et al. |
| 8,302,872 B2 | 11/2012 | Mullen |
| D672,389 S | 12/2012 | Mullen et al. |
| 8,322,623 B1 | 12/2012 | Mullen |
| D673,606 S | 1/2013 | Mullen et al. |
| D674,013 S | 1/2013 | Mullen et al. |
| D675,256 S | 1/2013 | Mullen et al. |
| 8,348,172 B1 | 1/2013 | Cloutier |
| D676,487 S | 2/2013 | Mullen et al. |
| D676,904 S | 2/2013 | Mullen et al. |
| 8,382,000 B2 | 2/2013 | Mullen |
| 8,393,545 B1 | 3/2013 | Mullen |
| 8,393,546 B1 | 3/2013 | Yen |
| 8,413,892 B2 | 4/2013 | Mullen |
| 8,424,773 B2 | 4/2013 | Mullen |
| 8,459,548 B2 | 6/2013 | Mullen |
| D687,094 S | 7/2013 | Mullen et al. |
| D687,095 S | 7/2013 | Mullen et al. |
| 8,485,437 B2 | 7/2013 | Mullen |
| 8,485,446 B1 | 7/2013 | Mullen |
| D687,487 S | 8/2013 | Mullen et al. |
| D687,488 S | 8/2013 | Mullen et al. |
| D687,489 S | 8/2013 | Mullen et al. |
| D687,490 S | 8/2013 | Mullen et al. |
| D687,887 S | 8/2013 | Mullen et al. |
| D688,744 S | 8/2013 | Mullen et al. |
| 8,511,574 B1 | 8/2013 | Yen |
| 8,517,276 B2 | 8/2013 | Mullen |
| 8,523,059 B1 | 9/2013 | Mullen |
| D692,053 S | 10/2013 | Mullen et al. |
| 8,561,894 B1 | 10/2013 | Mullen |
| 8,567,679 B1 | 10/2013 | Mullen |
| 10,007,916 B1 | 6/2018 | Chiarella et al. |
| 2008/0029607 A1 | 2/2008 | Mullen |
| 2008/0035738 A1 | 2/2008 | Mullen |
| 2008/0054068 A1 | 3/2008 | Mullen |
| 2008/0054079 A1 | 3/2008 | Mullen |
| 2008/0054081 A1 | 3/2008 | Mullen |
| 2008/0065555 A1 | 3/2008 | Mullen |
| 2008/0302869 A1 | 12/2008 | Mullen |
| 2008/0302876 A1 | 12/2008 | Mullen |
| 2009/0159663 A1 | 6/2009 | Mullen |
| 2009/0159667 A1 | 6/2009 | Mullen |
| 2009/0159668 A1 | 6/2009 | Mullen |
| 2009/0159669 A1 | 6/2009 | Mullen |
| 2009/0159670 A1 | 6/2009 | Mullen |
| 2009/0159671 A1 | 6/2009 | Mullen |
| 2009/0159672 A1 | 6/2009 | Mullen |
| 2009/0159673 A1 | 6/2009 | Mullen |
| 2009/0159680 A1 | 6/2009 | Mullen |
| 2009/0159681 A1 | 6/2009 | Mullen |
| 2009/0159682 A1 | 6/2009 | Mullen |
| 2009/0159688 A1 | 6/2009 | Mullen |
| 2009/0159689 A1 | 6/2009 | Mullen |
| 2009/0159690 A1 | 6/2009 | Mullen |
| 2009/0159696 A1 | 6/2009 | Mullen |
| 2009/0159697 A1 | 6/2009 | Mullen |
| 2009/0159698 A1 | 6/2009 | Mullen |
| 2009/0159699 A1 | 6/2009 | Mullen |
| 2009/0159700 A1 | 6/2009 | Mullen |
| 2009/0159701 A1 | 6/2009 | Mullen |
| 2009/0159702 A1 | 6/2009 | Mullen |
| 2009/0159703 A1 | 6/2009 | Mullen |
| 2009/0159704 A1 | 6/2009 | Mullen |
| 2009/0159705 A1 | 6/2009 | Mullen |
| 2009/0159706 A1 | 6/2009 | Mullen |
| 2009/0159707 A1 | 6/2009 | Mullen |
| 2009/0159708 A1 | 6/2009 | Mullen |
| 2009/0159709 A1 | 6/2009 | Mullen |
| 2009/0159710 A1 | 6/2009 | Mullen |
| 2009/0159711 A1 | 6/2009 | Mullen |
| 2009/0159712 A1 | 6/2009 | Mullen |
| 2009/0159713 A1 | 6/2009 | Mullen |
| 2009/0160617 A1 | 6/2009 | Mullen |
| 2009/0308921 A1 | 12/2009 | Mullen |
| 2011/0272465 A1 | 11/2011 | Mullen |
| 2011/0272466 A1 | 11/2011 | Mullen |
| 2011/0272467 A1 | 11/2011 | Mullen |
| 2011/0272471 A1 | 11/2011 | Mullen |
| 2011/0272472 A1 | 11/2011 | Mullen |
| 2011/0272473 A1 | 11/2011 | Mullen |
| 2011/0272474 A1 | 11/2011 | Mullen |
| 2011/0272475 A1 | 11/2011 | Mullen |
| 2011/0272476 A1 | 11/2011 | Mullen |
| 2011/0272477 A1 | 11/2011 | Mullen |
| 2011/0272478 A1 | 11/2011 | Mullen |
| 2011/0272479 A1 | 11/2011 | Mullen |
| 2011/0272480 A1 | 11/2011 | Mullen |
| 2011/0272481 A1 | 11/2011 | Mullen |
| 2011/0272482 A1 | 11/2011 | Mullen |
| 2011/0272483 A1 | 11/2011 | Mullen |
| 2011/0272484 A1 | 11/2011 | Mullen |
| 2011/0276380 A1 | 11/2011 | Mullen |
| 2011/0276381 A1 | 11/2011 | Mullen |
| 2011/0276416 A1 | 11/2011 | Mullen |
| 2011/0276424 A1 | 11/2011 | Mullen |
| 2011/0276425 A1 | 11/2011 | Mullen |
| 2011/0276436 A1 | 11/2011 | Mullen |
| 2011/0276437 A1 | 11/2011 | Mullen |
| 2011/0278364 A1 | 11/2011 | Mullen |
| 2011/0282753 A1 | 11/2011 | Mullen |
| 2011/0284632 A1 | 11/2011 | Mullen |
| 2011/0284640 A1 | 11/2011 | Mullen |
| 2012/0028702 A1 | 2/2012 | Mullen |
| 2012/0037709 A1 | 2/2012 | Cloutier |
| 2012/0197708 A1 | 8/2012 | Mullen |
| 2012/0209744 A1 | 8/2012 | Mullen |
| 2012/0254037 A1 | 10/2012 | Mullen |
| 2012/0254038 A1 | 10/2012 | Mullen |
| 2012/0286037 A1 | 11/2012 | Mullen |
| 2012/0286928 A1 | 11/2012 | Mullen |
| 2012/0286936 A1 | 11/2012 | Mullen |
| 2012/0290449 A1 | 11/2012 | Mullen |
| 2012/0290472 A1 | 11/2012 | Mullen |
| 2012/0318871 A1 | 12/2012 | Mullen |
| 2012/0326013 A1 | 12/2012 | Mullen |
| 2013/0020396 A1 | 1/2013 | Mullen |
| 2015/0220907 A1 | 8/2015 | Denton et al. |
| 2016/0217312 A1 | 7/2016 | Gardiner et al. |
| 2017/0213119 A1* | 7/2017 | Bae ............... G06K 19/07 |
| 2018/0260677 A1* | 9/2018 | Lee ............. G06K 19/0723 |

OTHER PUBLICATIONS

Ullmann et al., ""On-Card" User Authentication for Contactless Smart Cards based on Gesture Recognition", 2012, 12 pages.

Tensor plc, "Hand Gestures to Improve Smart Card Security by Adding an Additional Authentication Factor", https://www.tensor.co.uk/news/hand-gestures-to-improve-smart-card-security-by-adding-an-additional-authentication-factor/, Aug. 20, 2013, 1 page.

* cited by examiner

TOUCH AUTHENTICATION OF MULTIPLE USERS OR OPERATING MODES FOR A TRANSACTION CARD

BACKGROUND

Transaction cards (e.g., credit cards, debit cards, gift cards, automated teller machine (ATM) cards, rewards cards client loyalty cards, and/or the like) may be used to pay for products or services at transaction terminals (e.g., point of sale (PoS) terminals) or to access accounts (e.g., bank checking accounts) at transaction terminals (e.g., ATM terminals).

SUMMARY

According to some implementations, a method may include receiving, by a transaction card having one or more sensors associated with one or more processors, a first input containing a first touch sequence from a user, wherein the first touch sequence comprises one or more first touch gestures. The method may include determining, by the transaction card, that the first touch sequence corresponds to a first reference touch sequence associated with the user, and initiating, by the transaction card, a first operating mode associated with the first touch sequence based on determining that the first touch sequence corresponds to the first reference touch sequence, wherein the first operating mode is associated with the user and causes the transaction card to perform a first function. The method may include receiving, by the transaction card, a second input containing a second touch sequence from the user, wherein the second touch sequence comprises one or more second touch gestures, and wherein the one or more second touch gestures are different from the one or more first touch gestures. The method may include determining, by the transaction card, that the second touch sequence corresponds to a second reference touch sequence associated with the user, and initiating, by the transaction card, a second operating mode associated with the second touch sequence based on determining that the second touch sequence corresponds to the second reference touch sequence, wherein the second operating mode is associated with the user and causes the transaction card to perform a second function that is different from the first function, According to some implementations, a transaction card may include one or more sensors, one or more memories, and one or more processors, communicatively coupled to the one or more sensors and the one or more memories, to receive a first input containing a first touch sequence from a user via the one or more sensors, wherein the first touch sequence comprises one or more first touch gestures and the first touch sequence is associated with a first timing signature. The one or more processors may determine that the first touch sequence corresponds to a first reference touch sequence associated with the user and that the first timing signature corresponds to a first reference timing signature associated with the first reference touch sequence, and may initiate, on the transaction card, a first operating mode associated with the first touch sequence based on determining that the first touch sequence corresponds to the first reference touch sequence and that the first timing signature corresponds to the first reference timing signature, wherein the first operating mode is associated with the user and causes the transaction card to perform a first function. The one or more processors may receive a second input containing a second touch sequence from the user via the one or more sensors, wherein the second touch sequence comprises one or more second touch gestures and the second touch sequence is associated with a second timing signature, and wherein the second touch sequence is different from the first touch sequence. The one or more processors may determine that the second touch sequence corresponds to a second reference touch sequence associated with the user and that the second timing signature corresponds to a second reference timing signature associated with the second reference touch sequence. The one or more processors may initiate, on the transaction card, a second operating mode associated with the second touch sequence based on determining that the second touch sequence corresponds to the second reference touch sequence and the second timing signature corresponds to the second reference timing signature, wherein the second operating mode is associated with the user and causes the transaction card to perform a second function that is different from the first function.

According to some implementations, a non-transitory computer-readable medium may store instructions that include one or more instructions that, when executed by one or more processors of a transaction card, cause the one or more processors to receive, from one or more sensors associated with the transaction card, a first input containing a first touch sequence from a first user, wherein the first touch sequence comprises one or more first touch gestures. The one or more instructions may cause the one or more processors to determine that the first touch sequence corresponds to a first reference touch sequence associated with the first user, and to initiate, on the transaction card, a first operating mode associated with the first touch sequence, wherein the first operating mode is associated with the first user and causes the transaction card to perform a first function. The one or more instructions may cause the one or more processors to receive, from the one or more sensors associated with the transaction card, a second input containing a second touch sequence from a second user, wherein the second touch sequence comprises one or more second touch gestures, and wherein the second touch sequence is different from the first touch sequence. The one or more instructions may cause the one or more processors to determine that the second touch sequence corresponds to a second reference touch sequence associated with the second user, and to initiate, on the transaction card, a second operating mode associated with the second touch sequence based on determining that the second touch sequence corresponds to the second reference touch sequence, wherein the second operating mode is associated with the second user and causes the transaction card to perform a second function that is different from the first function.

DETAILED DESCRIPTION

Figure 1A:
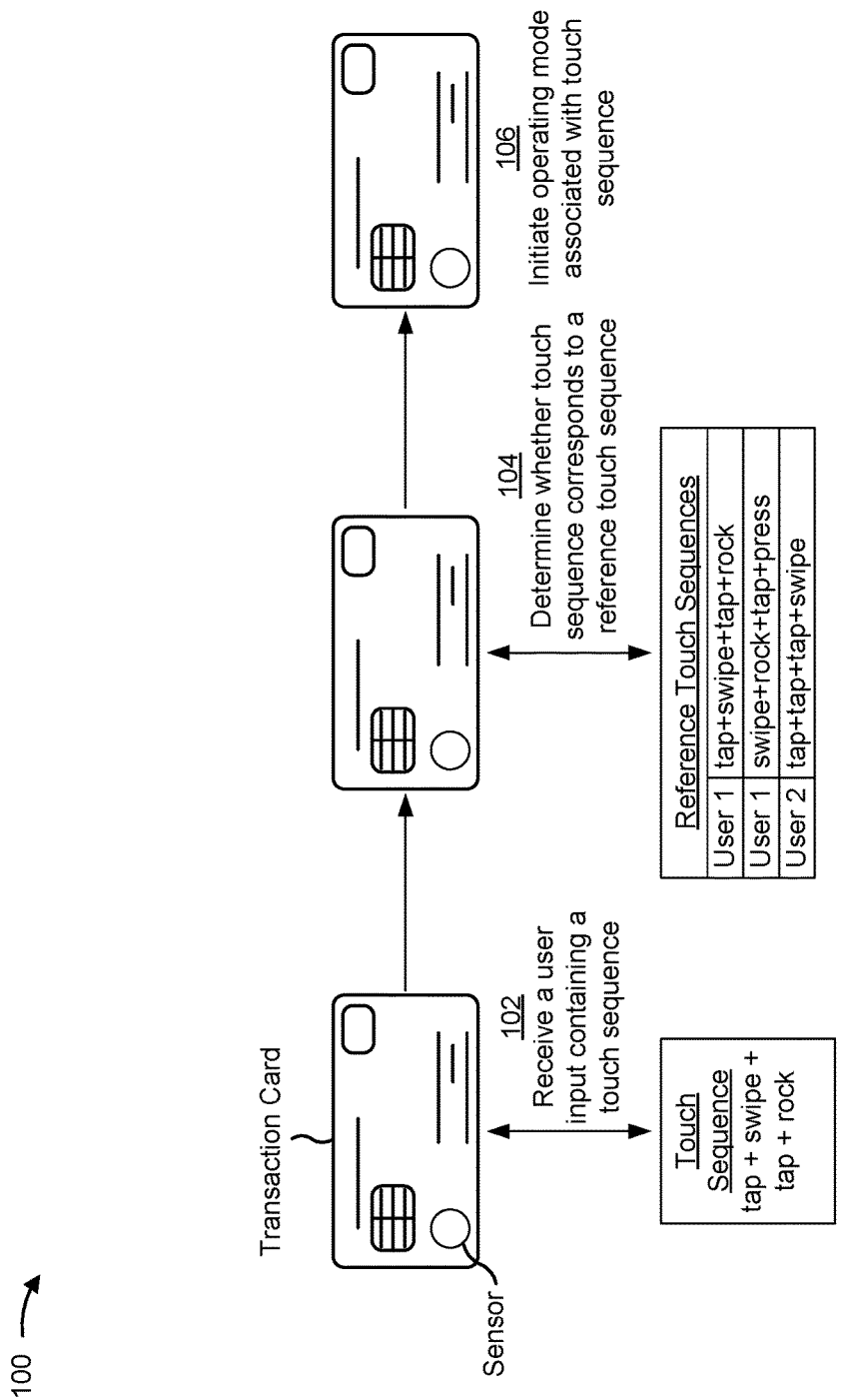
FIGS. 1A and 1B are diagrams of one or more example implementations described herein.

The following detailed description of example implementations refers to the accompanying drawings. The same reference numbers in different drawings may identify the same or similar elements.

Transaction cards may be used to execute transactions at transaction terminals (e.g., PoS terminals) or to access accounts at transaction terminals (e.g., ATM terminals). Often, an individual may have several accounts with one or more financial institutions, and as a result, carry multiple transaction cards. For example, the individual may carry a debit card(s) to make purchases from funds in a checking account(s), a credit card(s) to make purchases with a credit account(s), and a bank card(s) to access a bank account(s) (e.g., at an ATM terminal).

Carrying multiple transaction cards is cumbersome for the individual and requires the issuing financial institution(s) to utilize or procure additional materials and manufacturing resources associated with producing transaction cards. In some instances, the individual may consolidate multiple transaction cards into a digital wallet that is associated with a user device (e.g., a smartphone). However, this practice requires a third-party device that may lack widespread interoperability with transaction terminals (e.g., PoS terminals, ATM terminals, etc.) and may present a security risk (e.g., if the third-party device is infected with malware).

Transaction cards are also a common target of theft or misuse because of their ability to make payments and/or access funds. For example, transaction cards may be physically stolen and used to perform unauthorized transactions, or information relating to the transaction card, such as the card identification number, may be captured and used to perform unauthorized transactions.

Current security measures to prevent unauthorized use of a lost or stolen card may include requiring the entry of a passcode, such as a personal identification number (PIN) or a zip code, at the time of a transaction. However, passcodes are often entered in a manner that is open to the public (e.g., at a bank or a retail store in the presence of onlookers or hidden cameras) and are susceptible to being captured by a third party.

Many modern transaction cards contain embedded integrated circuits (e.g., smart cards) to store authentication data that is provided to an authenticating device (e.g., a PoS terminal, an ATM, etc.) at the time of a transaction. However, third parties may exploit weaknesses in the software or hardware of a smart card to capture the authentication data. Other types of smart cards may employ fingerprint readers that require an authorized user to provide a fingerprint at the time of a transaction. However, smart cards with fingerprint readers may also be exploited (e.g., by lifting a fingerprint pattern from a fingerprint reader that has not been wiped clean).

Thus, current security measures for transaction cards fail to adequately deter and prevent unauthorized use. Unauthorized transactions may cause millions or billions of dollars in additional expenses for the financial institution that issued the transaction card as well as waste computing and network resources involved in identifying, investigating, and/or correcting fraudulent activity.

Some implementations described herein include a transaction card that may include one or more sensors to detect a touch sequence of one or more touch gestures from a user of the transaction card. The touch sequence provides authentication of the user's identity and instructs the transaction card to initiate an operating mode that may cause, or enable, the transaction card to perform one or more transactional functions.

In this way, the user does not need to view the transaction card or another visual interface in order to provide an authentication input, thereby allowing for the transaction card and the touch sequence to be concealed from public view (e.g., the user may input the touch sequence while the transaction card is in a pocket, in a purse, under a table, etc.). In doing so, unauthorized use of the transaction card may be reduced, thereby conserving computing resources (e.g., processing resources, memory resources, and/or the like) and/or network resources involved in identifying, investigating, and/or correcting fraudulent activity that would have been allowed without the use of the transaction card described herein.

In addition, the transaction card described herein may receive as input, and recognize, multiple touch sequences that correspond to different operating modes for the transaction card. For example, a user (e.g., the cardholder) may perform multiple functions on one transaction card, or multiple users (e.g., the cardholder and one or more relatives) may share a single transaction card. In this way, the functionality of numerous transaction cards may be consolidated to a single transaction card, thereby reducing material use (e.g., plastic, magnetic strips, integrated circuits, etc.) and manufacturing resources that would otherwise be wasted by manufacturing multiple transaction cards.

Furthermore, the transaction card may differentiate between dozens of users and/or operating modes by recognizing complex authentication sequences (e.g., touch sequences) through an integrated input interface (e.g., the one or more sensors). In this way, the transaction card may facilitate dozens of different types of transactions by dozens of different users without the use of an external interface, such as a keypad, a keyboard, or a user device (e.g., a smartphone).

Figure 1B:
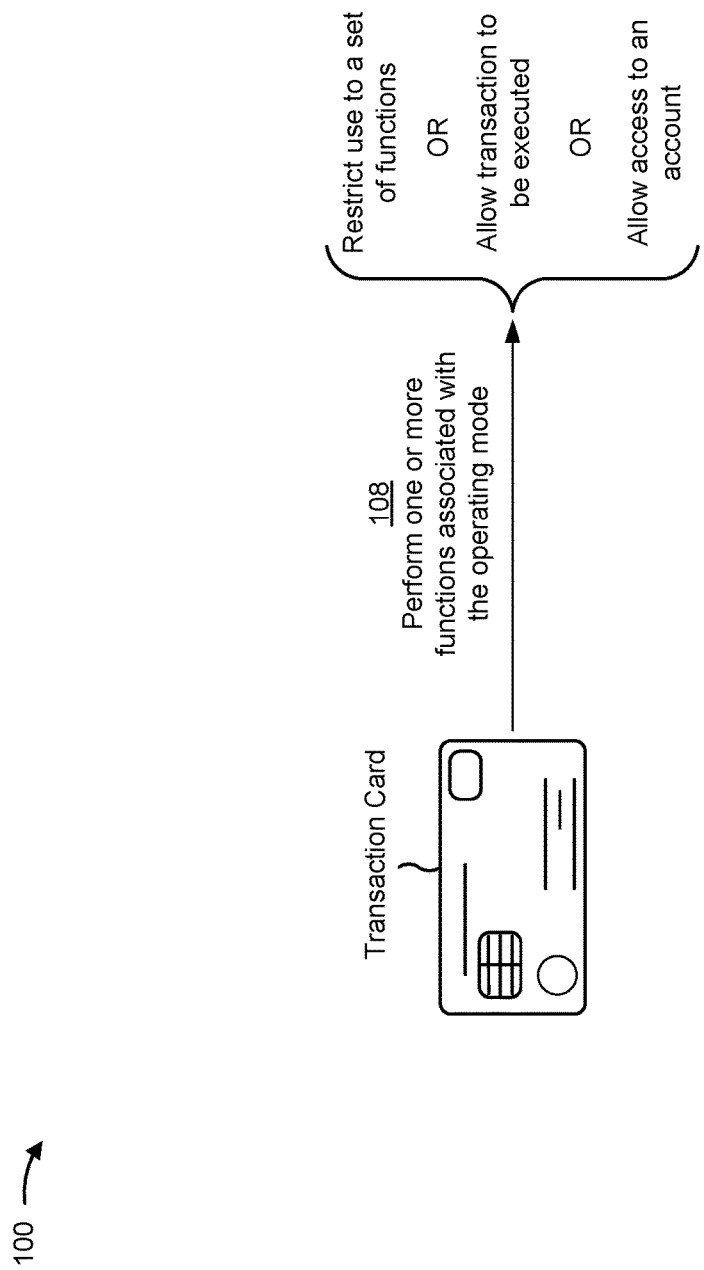

FIGS. 1A and 1B are diagrams of one or more example implementations 100 described herein. As shown in FIGS. 1A and 1B, example implementation(s) 100 may include a transaction card (e.g., credit card, debit card, bank card, and/or the like). The transaction card may receive a touch sequence from a user as an input, authenticate the touch sequence, and initiate an operating mode, based on the authenticated touch sequence, that causes, or enables, the transaction card to perform one or more transactional functions associated with the user. In some implementations, the user may be authenticated by a first factor and the touch sequence may be a second factor for authenticating the user.

In some implementations, the transaction card may be associated with an organization, such as a financial institution (e.g., a bank) or a merchant, that issues the transaction card to a cardholder. While the description to follow will be described in terms of an example of a transaction card issued by a financial institution or merchant, the description is not limited to this particular example. Implementations described herein also apply to other types of cards issued by other organizations (e.g., identification cards issued by governments or schools, benefits cards issued by governments, building access cards issued by employers, etc.) and other devices that may be used to receive and authenticate an input from a user (e.g., a smartphone or tablet computer that may receive input entered by a touchscreen interface, a laptop computer that may receive input entered by a touchpad interface, a desktop computer that may receive input entered by a mouse or keyboard interface, and/or the like).

As shown in FIGS. 1A and 1B, the transaction card may include one or more sensors (e.g., one or more piezoelectric sensors, capacitive touch sensors, fingerprint sensors, accelerometers, and/or the like) that provide an interface for a user of the transaction card to input a touch sequence. The one or more sensors may be embedded within the transaction card or affixed to a surface of the transaction card. In some implementations, the one or more sensors may be located at a front side of the transaction card, may be located at a back side of the transaction card, and/or may be located along one or more edges of the transaction card. In some implementations, one or more first sensors may be located at a front side of the transaction card, one or more second sensors may be located at a back side of the transaction card, and/or one or more third sensors may be located along one or more edges of the transaction card.

The transaction card also may include one or more additional components, such as one or more display devices (e.g., a light-emitting diode (LED) display, an electronic paper (e-paper) display, and/or the like) to display information about the user, the operating mode, or the transaction card. For example, the display device may display an identification number of the transaction card rather than the identification number being printed on the transaction card.

In some implementations, the one or more sensors and/or the one or more additional components may receive power from a battery of the transaction card or from a device associated (e.g., by connection, contact, or proximity) with the transaction card (e.g., a user device, a chip reader of a PoS terminal, an ATM terminal, and/or the like). For example, as part of a purchase transaction, a PoS terminal may provide power to a transaction card (e.g., a smart card with an integrated circuit chip) that is inserted into the chip reader of the PoS terminal.

As shown in FIG. 1A, and by reference number 102, the transaction card may receive (e.g., by the one or more sensors) a user input of a touch sequence. The touch sequence may be a pattern of physical interactions between a body of the user (e.g., one or more fingers of the user) and the transaction card that serves to differentiate multiple users and/or operating modes of the transaction card.

In some implementations, the touch sequence may include one or more touch gestures that may relate to a pressure of a touch (e.g., an amount of force applied to the transaction card by the user), a duration of a touch (e.g., an amount of time that the user remained in contact with the transaction card), a tap, a swipe, a pattern of motion (e.g., a circular motion, a triangular motion, a rectangular motion, etc.), a rocking touch, a surface area of a touch, an alternating touch (e.g., simultaneous swipes to the front side and the back side of the transaction card in opposite directions), a pinching touch (e.g., a simultaneous touch to the front side and the back side of the transaction card), a rotating action (e.g., a rotating of the transaction card about an axis of the transaction card), and/or a bending action (e.g., a flexing of the transaction card performed by applying force to opposite edges of the transaction card). For example, a touch sequence of three touch gestures may be tap, swipe, rock.

In some implementations the transaction card may recognize and categorize inputted touch gestures according to definitions of the touch gestures that may be stored by the transaction card (e.g., in a memory of the transaction card or in a memory of a device associated with the transaction card, such as a smartphone). For example, a touch gesture may be defined by a duration of the touch gesture, a direction of the touch gesture, a shape of the touch gesture, and/or an area of the touch gesture.

The touch gestures are inconspicuous actions that may be input into the one or more sensors associated with the transaction card without requiring the user to view the inputting process. For example, the touch gestures may be input to the transaction card while the transaction card is in a pocket of the user. In some implementations, the touch gestures may be input anywhere on the transaction card (e.g., the front side of the transaction card, the back side of the transaction card, and/or the one or more edges of the transaction card). Additionally, or alternatively, the touch gestures may be input to the transaction card without regard to an orientation of the transaction card. For example, the transaction card may recognize and categorize inputted touch gestures when the transaction card is in a first orientation (e.g., upright at 0 degrees), a second orientation (e.g., upside down at 180 degrees), a third orientation (e.g., sideways at 90 degrees), a fourth orientation (e.g., sideways at 270 degrees), or any orientation in between (e.g., between 0 and 90 degrees, 90 and 180 degrees, 180 and 270 degrees, or 270 and 0 degrees). In this way, the transaction card conserves computing resources (e.g., processing resources, memory resources, and/or the like) that would otherwise be wasted attempting to interpret touch gestures that are input when the transaction card is in an unrecognized orientation, as may occur when the touch gestures are input to the transaction card while the transaction card is in a pocket of a user.

Furthermore, residue left on the sensor from a touch gesture does not identify the touch gesture or an order of a touch sequence, as would be the case for a fingerprint sensor that is not wiped clean. In this way, a third party in possession of a lost or stolen transaction card would be prevented from making unauthorized transactions, thereby conserving computing and/or network resources involved in identifying, investigating, and/or correcting fraudulent activity that would have otherwise been allowed.

Furthermore, dozens of different touch gestures may be recognized by the transaction card and used to form complex touch sequences that can differentiate between dozens of users and/or operating modes without needing an external interface (e.g., a keypad, a keyboard, a user device, etc.) to input a complex sequence. For example, a complex sequence of numeric digits requires a keypad, with an input corresponding to each digit (e.g., one input for each digit 0-9), that could not reasonably be integrated with a transaction card due to size limitations.

As shown by reference number 104, the transaction card may grant or deny a user access to an operating mode of the transaction card by determining whether the touch sequence input by the user corresponds to a reference touch sequence stored by the transaction card. The transaction card may store (e.g., in a memory of the transaction card), or cause to be stored (e.g., in a user device, such as a smartphone, associated with the transaction card), a reference touch sequence in association with a user of the transaction card and/or an operating mode of the transaction card. In some implementations, a reference touch sequence may be stored in a device (e.g., a server device associated with a financial institution) and/or a transaction terminal.

The transaction card may determine that the inputted touch sequence and the reference touch sequence correspond based on several criteria. In some implementations, the identity and order of the touch gestures in the touch sequence and the reference touch sequence need to be the same for the touch sequence to correspond to the reference touch sequence. For example, a touch sequence of tap, swipe, rock may correspond to a reference touch sequence of tap, swipe, rock and may not correspond to a reference touch sequence of swipe, rock, tap.

In some implementations, the identity, but not the order, of the touch gestures in the touch sequence and the reference touch sequence need to be the same for the touch sequence to correspond to the reference touch sequence. For example, a touch sequence of tap, swipe, rock may correspond to a reference touch sequence of swipe, tap, rock.

In some implementations, the touch sequence may correspond to the reference touch sequence when the touch sequence is one or more circular shifts of the reference touch sequence. As used herein, a circular shift refers to an operation of rearranging the touch gestures in a touch sequence, either by moving the final touch gesture to the first position, while shifting all other touch gestures to the next position, or by performing the inverse operation. For example, a touch sequence of rock, tap, swipe is a first rightward circular shift of, and may correspond to, a reference touch sequence of tap, swipe, rock. In this way, the user may change the input of the touch sequence with any use of the transaction card, thereby making capture of the underlying reference touch sequence by a third party more difficult.

In some implementations, the transaction card may grant or deny access to an operating mode of the transaction card by determining whether a timing signature associated with the inputted touch sequence corresponds to a timing signature associated with the reference touch sequence. The timing signature may be defined according to parameters related to the manner in which the touch sequence is input, such as a duration of a pause between one touch gesture of the touch sequence and the following touch gesture of the touch sequence, a duration of a touch of a touch gesture, a duration of the input of the touch sequence, and/or the like. For example, although the touch gestures are the same, a touch sequence and associated timing signature of tap (pause for 1 second), swipe (pause for 2 seconds), rock (for a duration of 2 seconds) does not correspond to a reference touch sequence and associated timing signature of tap (pause for 3 seconds), swipe (pause for 0.5 seconds), rock (for a duration of 1 second). In this way, a touch sequence may be given an additional dimension of complexity, thereby making unauthorized use of the transaction card by a third party more difficult.

In some implementations, the transaction card may perform a security action based on determining that a touch sequence does not correspond to a reference touch sequence of the transaction card. For example, the transaction card may communicate an alert (e.g., to a user device associated with the cardholder (e.g., a smartphone), to a device associated with a financial institution (e.g., a server device), to a transaction terminal, and/or the like) when an inputted touch sequence does not correspond to a reference touch sequence. In some implementations, the transaction card may initiate a lock state or display text (e.g., text indicating that the transaction card detected unauthorized use) when an inputted touch sequence does not correspond to a reference touch sequence. In some implementations, the transaction card may communicate an alert, initiate a lock state, and/or display text when an inputted touch sequence does not correspond to a reference touch sequence after a threshold number of consecutive attempts (e.g., 5 attempts, 10 attempts, etc.) have been made to access an operating mode of the transaction card.

In some implementations, the one or more reference touch sequences, and associated operating modes, for a transaction card are set by the manufacturer or issuer of the transaction card. Additionally, or alternatively, the one or more reference touch sequences, and associated operating modes, may be set or reset by a user (e.g., the cardholder) of the transaction card. For example, the transaction card may initiate an administrative operating mode, upon an action by a user (e.g., inputting a touch sequence associated with the administrative operating mode, activating a switch on the transaction card, such as a piezoelectric switch, and/or the like), in which settings for the transaction card, such as the one or more reference touch sequences and associated operating modes, may be defined or modified (e.g., by inputting a reference touch sequence to the transaction card). As another example, a device (e.g., a smartphone, a tablet computer, a desktop computer, and/or the like) or a transaction terminal (e.g., a PoS terminal, an ATM terminal, and/or the like) may provide an interface for a user to input and/or select a reference touch sequence and/or select from a selection of preset operating modes and/or functions, that are stored to the transaction card (e.g., by wireless communication or by a physical connection between the transaction card and the device or transaction terminal).

As shown by reference number 106, the transaction card may initiate an operating mode based on determining that the touch sequence input by a user corresponds to a reference touch sequence stored by the transaction card. The operating mode defines the permissible transactional functions that the transaction card may perform.

In some implementations, the transaction card may have one or more operating modes associated with one or more users of the card. For example, the transaction card may have one operating mode that is associated with the cardholder and another operating mode that is associated with a relative of the cardholder. As another example, the transaction card may have first and second operating modes that are both associated with the cardholder. In this way, the transaction card may switch between different operating modes according to the inputted touch sequence, thereby enabling a user, or a group of users, to consolidate the functionality of multiple transaction cards into a single transaction card.

As shown in FIG. 1B, and by reference number 108, an operating mode for the transaction card may cause the transaction card to perform one or more functions associated with the operating mode. The functions cause, or enable, the transaction card to perform various tasks or operations, as described below, that the transaction card would not otherwise be able to perform outside of the operating mode.

In some implementations, a function of an operating mode may restrict the functions available to the transaction card to a certain set. For example, an operating mode associated with a user (e.g., a child of the cardholder) may cause a restriction of the functions that may be performed by the transaction card (e.g., restrict the transaction card to debit transactions only, gas station transactions only, card-present transactions only, and/or the like). In this way, a cardholder may permit one or more other users (e.g., relatives of the cardholder) to use the transaction card without providing unrestricted access to the full range of capabilities of the transaction card.

In some implementations, a function of an operating mode may provide for transactions (e.g., credit transactions, debit transactions, ATM transactions, and/or the like) to be executed by the transaction card. In this way, the transaction card may prevent unauthorized transactions from being executed, thereby conserving computing resources (e.g., processing resources, memory resources, power resources, and/or the like) and/or network resources involved in identifying, investigating, and/or correcting the unauthorized activity that would have been allowed otherwise.

In some implementations, a function of an operating mode may provide for the transaction card to access an account (e.g., bank account) of the user. For example, the operating mode may permit the transaction card to access an account of the user by an ATM terminal or by a PoS terminal without the user needing to key an authentication PIN. In this way, the transaction card provides for improved security of sensitive authentication information (e.g., passcodes, PINs, etc.), which may be entered privately by the user out of view of onlookers or hidden cameras.

In some implementations, a function of an operating mode may provide for the transaction card to operate as a single type of transaction card or to operate as a transaction card issued by a single financial institution. For example, the transaction card may have one operating mode that causes the transaction card to operate as a credit card, another operating mode that causes the transaction card to operate as a debit card, and a further operating mode that causes the transaction card to operate as a bank card. As another example, the transaction card may have one operating mode that causes the transaction card to operate as a transaction card from one issuer (e.g., a credit card issued by a first financial institution) and another operating mode that causes the transaction card to operate as another transaction card from another issuer (e.g., a credit card issued by a second financial institution). In this way, the transaction card described herein may permit switching between dozens of different transactional functions and/or accounts that would otherwise require the use of a digital wallet through an external device (e.g., smartphone) that may lack interoperability with transaction terminals (e.g., PoS terminals, ATM terminals, etc.).

In some implementations, a function of an operating mode may provide for the display of information about the user, the operating mode, and/or the transaction card on a display of the transaction card. For example, the transaction card may have an operating mode that causes the display of a name of the user associated with the operating mode, that causes the display of a card identifier of the transaction card, that causes the display of card information, such as a card expiration date or a card security code, and/or the like.

As another example, the transaction card may have an operating mode that causes the display of information (e.g., the user name, the transaction card identification number, the transaction card expiration date, the transaction card security code, etc.) to toggle from a visible state to an invisible state or from an invisible state to a visible state. For example, a user may initiate an operating mode to toggle the transaction card identification number to an invisible state prior to providing the transaction card to a third party (e.g., a restaurant waiter) to execute a transaction. In this way, certain sensitive information associated with the transaction card may be selectively displayed to prevent capture of the information by a third party, thereby reducing fraudulent activity associated with the transaction card and conserving resources that would otherwise be used to identify, investigate, and/or correct the fraudulent activity.

While in an operating mode, the transaction card may perform one or more transactional functions (e.g., credit transactions, debit transactions, and/or the like) according to ordinary conventions (e.g., swiping or inserting the transaction card at a PoS terminal, an ATM terminal, etc.). The transaction card, after executing a transaction, may exit the operating mode and return to a default state in which the transaction card lacks transactional abilities.

For example, the transaction card may return to a default state upon the expiration of a preset amount of time from the initiation of the operating mode (e.g., 2 minutes, 5 minutes, 10 minutes, etc.). As another example, the transaction card may return to a default state upon the user performing an action (e.g., completing a transaction with the transaction card, re-inputting the touch sequence that initiated the operating mode, inputting a touch sequence associated with a default state of the transaction card, activating a switch on the transaction card, such as a piezoelectric switch, and/or the like).

As indicated above, FIGS. 1A and 1B are provided merely as an example. Other examples may differ from what was described with regard to FIGS. 1A and 1B.

Figure 2:
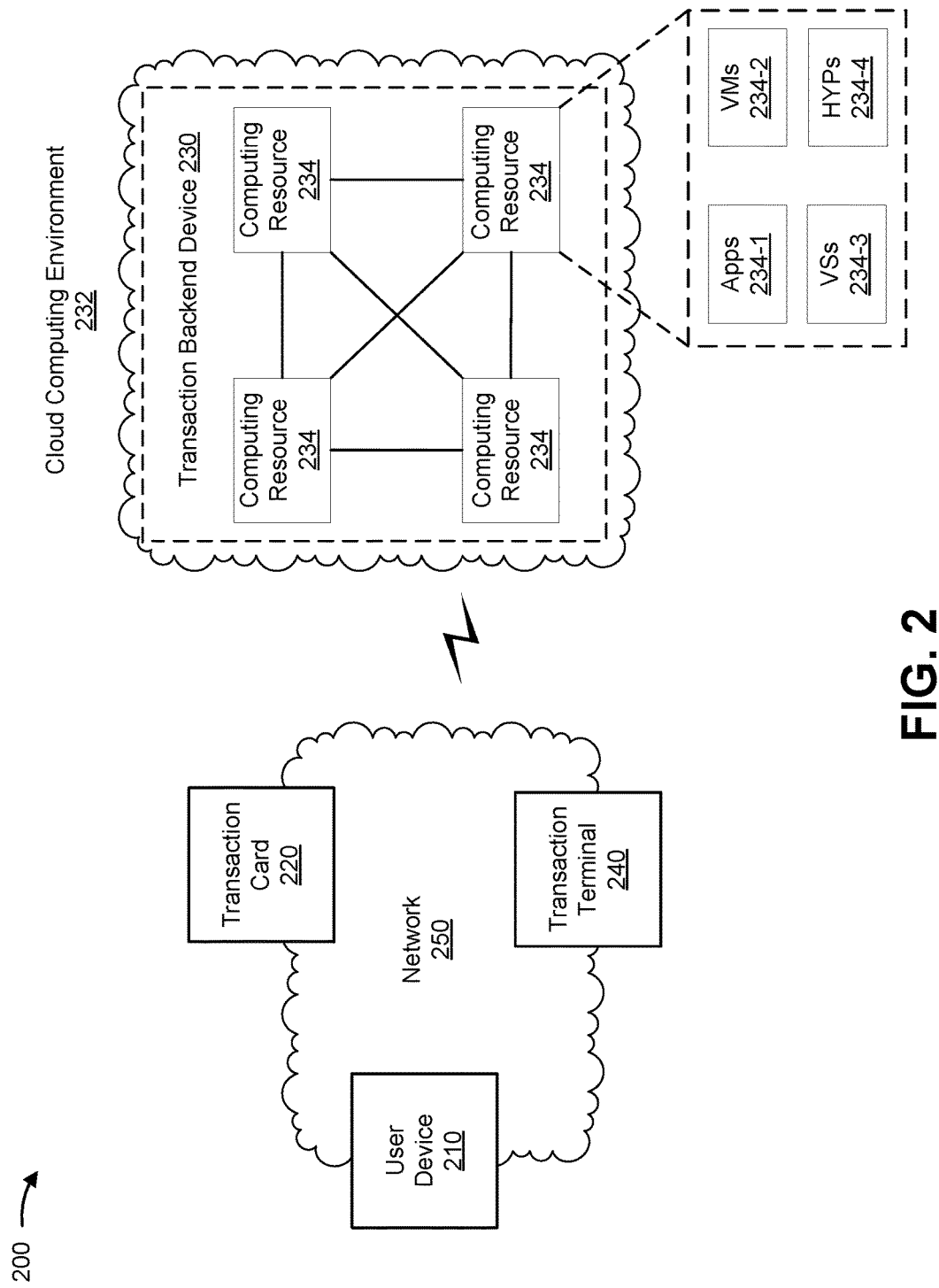
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a user device 210, a transaction card 220, a transaction backend device 230, a cloud computing environment 234, a transaction terminal 240, and a network 250. Devices of environment 200 may interconnect via wired connections, wireless connections, or a combination of wired and wireless connections.

User device 210 includes one or more devices capable of receiving, generating, storing, processing, and/or providing information associated with touch authentication of multiple users or operating modes for a transaction card. For example, user device 210 may include a communication and/or computing device, such as a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), or a similar type of device.

Transaction card 220 includes a transaction card that can be used to complete a transaction. For example, transaction card 220 may include a credit card, a debit card, a gift card, a payment card, an automated teller machine (ATM) card, a stored-value card, a fleet card, a transit card, an access card, a virtual card implemented on user device 210, and/or the like. Transaction card 220 may be capable of storing and/or communicating data for a point-of-sale (PoS) transaction with transaction terminal 240. For example, transaction card 220 may store and/or communicate data, including account information (e.g., an account identifier, a cardholder identifier, etc.), expiration information of transaction card 220 (e.g., information identifying an expiration month and/or year of transaction card 220), banking information (e.g., a routing number of a bank, a bank identifier, etc.), transaction information (e.g., a payment token), and/or the like. For example, to store and/or communicate the data, transaction card 220 may include a magnetic strip and/or an integrated circuit (IC) chip (e.g., a EUROPAY®, MASTERCARD®, VISA® (EMV) chip).

Transaction card 220 may include an antenna to communicate data associated with transaction card 220. The antenna may be a passive radio frequency (RF) antenna, an active RF antenna, and/or a battery-assisted RF antenna. In some implementations, transaction card 220 may be a smart transaction card, capable of communicating wirelessly (e.g., via Bluetooth, Bluetooth Low Energy (BLE), near-field communication (NFC), and/or the like) with a computing device, such as user device 210, a digital wallet, and/or another device. In some implementations, transaction card 220 may communicate with transaction terminal 240 to complete a transaction (e.g., based on being moved within communicative proximity of transaction terminal 240), as described elsewhere herein.

Transaction backend device 230 includes one or more devices capable of authorizing and/or facilitating a transaction. For example, transaction backend device 230 may include one or more servers and/or computers to store and/or provide information associated with processing a transaction via transaction terminal 240. In some implementations, transaction backend device 230 may process information associated with an operating mode of transaction card 220 to approve and/or complete a transaction, as described elsewhere herein. Additionally, or alternatively, transaction backend device 230 may receive and alert from transaction card 220, as described elsewhere herein.

Transaction backend device 230 may include one or more devices associated with a financial institution (e.g., a bank, a lender, a credit union, etc.) and/or a transaction card association that authorizes a transaction and/or facilitates a transfer of funds or payment between an account associated with a cardholder of transaction card 220 and an account of an individual or business associated with transaction terminal 240. For example, transaction backend device 230 may include one or more devices of one or more issuing banks associated with a cardholder of transaction card 220, one or more devices of one or more acquiring banks (or merchant banks) associated with transaction terminal 240, and/or one or more devices associated with one or more transaction card associations (e.g., VISA®, MASTERCARD®, and/or the like) associated with transaction card 220. Accordingly, based on receiving information associated with transaction card 220 from transaction terminal 240, devices of transaction backend device 230 (e.g., associated with a financial institution or transaction card association) may communicate to authorize a transaction and/or transfer funds between the accounts associated with transaction card 220 and/or transaction terminal 240.

Transaction backend device 230 may provide or deny authorization associated with a transaction. For example, transaction backend device 230 may store and/or provide information that may allow, or deny, access through an access point (e.g., a gate, a door, and/or the like) of a secure location (e.g., a room, a building, a geographical area, a transportation terminal, and/or the like) based on information (e.g., account information, a key, an identifier, credentials, and/or the like) associated with transaction card 220 and/or provided by transaction terminal 240.

Transaction backend device 230 may include one or more devices associated with a rewards program associated with transaction card 220 and/or an entity (e.g., a financial institution, a merchant, a service provider, a vendor, and/or the like) associated with transaction card 220 and/or transaction terminal 240. For example, transaction backend device 230 may authorize the earning and/or redemption of rewards (e.g., rewards points associated with transaction card 220, cash rewards, client loyalty rewards associated with an entity associated with transaction terminal 240, and/or the like) based on a transaction processed by transaction terminal 240.

Transaction backend device 230 may include a server device or a group of server devices. In some implementations, transaction backend device 230 may be hosted in cloud computing environment 232. Notably, while implementations described herein describe transaction backend device 230 as being hosted in cloud computing environment 232, in some implementations, transaction backend device 230 may be non-cloud-based or may be partially cloud-based.

Cloud computing environment 232 includes an environment that delivers computing as a service, whereby shared resources, services, etc. may be provided to user device 210, transaction card 220, transaction terminal 240, and/or the like. Cloud computing environment 232 may provide computation, software, data access, storage, and/or other services that do not require end-user knowledge of a physical location and configuration of a system and/or a device that delivers the services. As shown, cloud computing environment 232 may include transaction backend device 230 and computing resource 234.

Computing resource 234 includes one or more personal computers, workstation computers, server devices, or another type of computation and/or communication device. In some implementations, computing resource 234 may host transaction backend device 230. The cloud resources may include compute instances executing in computing resource 234, storage devices provided in computing resource 234, data transfer devices provided by computing resource 234, etc. In some implementations, computing resource 234 may communicate with other computing resources 234 via wired connections, wireless connections, or a combination of wired and wireless connections.

As further shown in FIG. 2, computing resource 234 may include a group of cloud resources, such as one or more applications ("APPs") 234-1, one or more virtual machines ("VMs") 234-2, virtualized storage ("VSs") 234-3, one or more hypervisors ("HYPs") 234-4, or the like.

Application 234-1 includes one or more software applications that may be provided to or accessed by user device 210 and/or transaction card 220. Application 234-1 may eliminate a need to install and execute the software applications on user device 210 and/or transaction card 220. For example, application 234-1 may include software associated with transaction backend device 230 and/or any other software capable of being provided via cloud computing environment 232. In some implementations, one application 234-1 may send/receive information to/from one or more other applications 234-1, via virtual machine 234-2.

Virtual machine 234-2 includes a software implementation of a machine (e.g., a computer) that executes programs like a physical machine. Virtual machine 234-2 may be either a system virtual machine or a process virtual machine, depending upon use and degree of correspondence to any real machine by virtual machine 234-2. A system virtual machine may provide a complete system platform that supports execution of a complete operating system ("OS"). A process virtual machine may execute a single program and may support a single process. In some implementations, virtual machine 234-2 may execute on behalf of a user (e.g., user device 210 and/or transaction card 220), and may manage infrastructure of cloud computing environment 232, such as data management, synchronization, or long-duration data transfers.

Virtualized storage 234-3 includes one or more storage systems and/or one or more devices that use virtualization techniques within the storage systems or devices of computing resource 234. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 234-4 provides hardware virtualization techniques that allow multiple operating systems (e.g., "guest operating systems") to execute concurrently on a host computer, such as computing resource 234. Hypervisor 234-4 may present a virtual operating platform to the guest operating systems and may manage the execution of the guest operating systems. Multiple instances of a variety of operating systems may share virtualized hardware resources.

Transaction terminal 240 includes one or more devices capable of facilitating processing of a transaction associated with transaction card 220. For example, transaction terminal 240 may include a point-of-sale (PoS) terminal, a payment terminal (e.g., a credit card terminal, a contactless payment terminal, a mobile credit card reader, a chip reader, etc.), a security access terminal, an automated teller machine (ATM) terminal, and/or the like. In some implementations, transaction terminal 240 may communicate with transaction backend device 230 to provide, to transaction backend device 230, information related to a transaction for which transaction card 220 is being used, as described elsewhere herein.

In some implementations, transaction terminal 240 may include one or more input components and/or output components to facilitate obtaining information from transaction card 220 (e.g., an account number of an account associated with transaction card 220, an expiration date of transaction card 220, etc.), input (e.g., a PIN, a signature, biometric information, etc.), from a cardholder of transaction card 220, related to completing and/or authorizing a transaction, and/or the like. In some implementations, example input components of transaction terminal 240 may include a number keypad, a touchscreen, a magnetic strip reader, a chip reader, a pen and corresponding signature pad, an RF signal reader, and/or the like.

In some implementations, a magnetic strip reader of transaction terminal 240 may receive data from transaction card 220 as a magnetic strip of transaction card 220 is swiped along the magnetic strip reader. In some implementations, a chip reader of transaction terminal 240 may receive data from transaction card 220 via an integrated circuit chip (e.g., an EMV chip) of transaction card 220 when the chip is placed within communicative proximity of the chip reader. In some implementations, an RF signal reader of transaction terminal 240 may enable a contactless transaction from transaction card 220 and/or user device 210 by obtaining data wirelessly from transaction card 220 and/or user device 210 as transaction card 220 and/or user device 210 comes within communicative proximity of transaction terminal 240, such that the RF signal reader detects an RF signal from an RF antenna of transaction card 220 and/or user device 210.

In some implementations, example output components of transaction terminal 240 may include a display, a speaker, a printer, a light, and/or the like. In some implementations, transaction terminal 240 may use an output component to output information related to a transaction (e.g., an indication to cause a user to input information to authorize a transaction, information that identifies whether a transaction was completed, etc.).

Network 250 includes one or more wired and/or wireless networks. For example, network 250 may include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
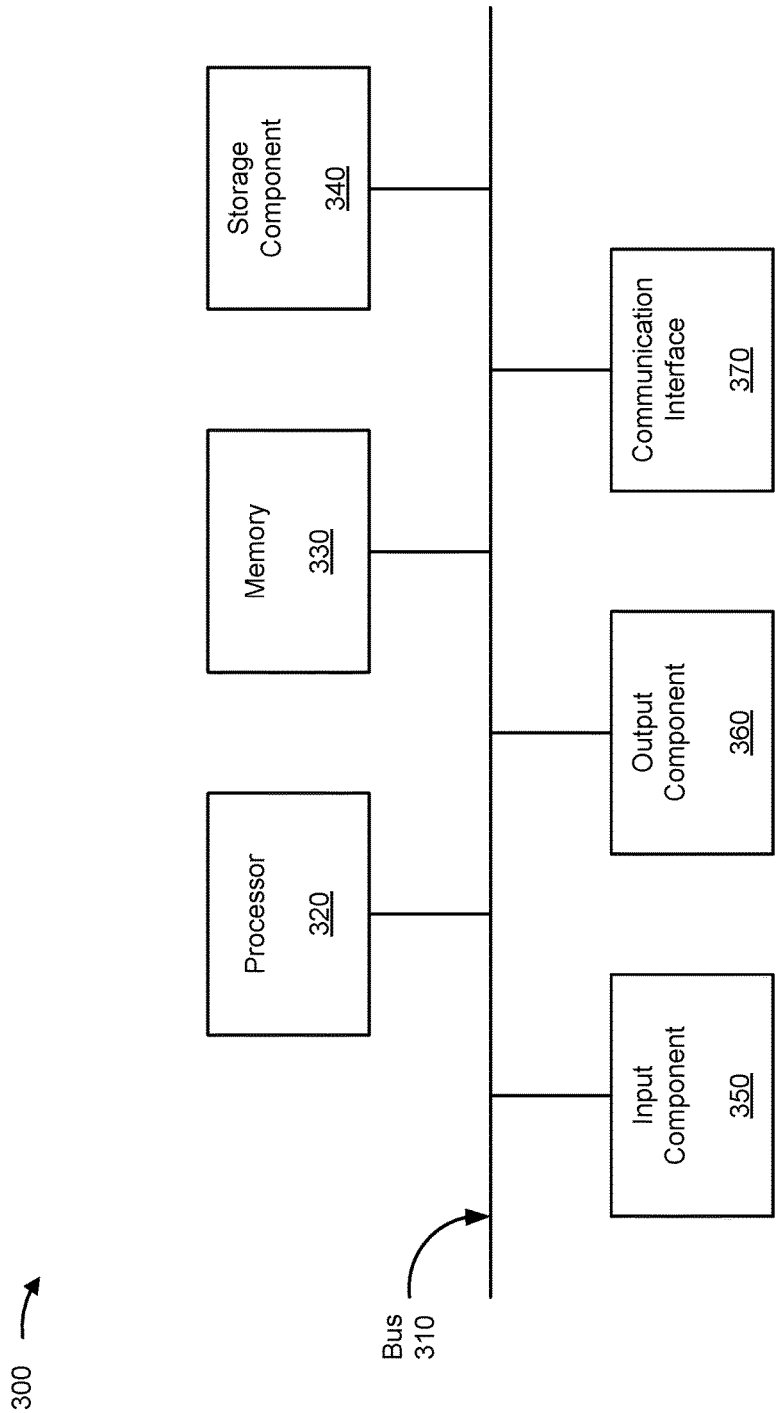
FIG. 3 is a diagram of example components of one or more devices of FIG. 2.

FIG. 3 is a diagram of example components of a device 300. Device 300 may correspond to user device 210, transaction card 220, transaction backend device 230, computing resource 234, and/or transaction terminal 240. In some implementations, user device 210, transaction card 220, transaction backend device 230, computing resource 234, and/or transaction terminal 240 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS)

component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
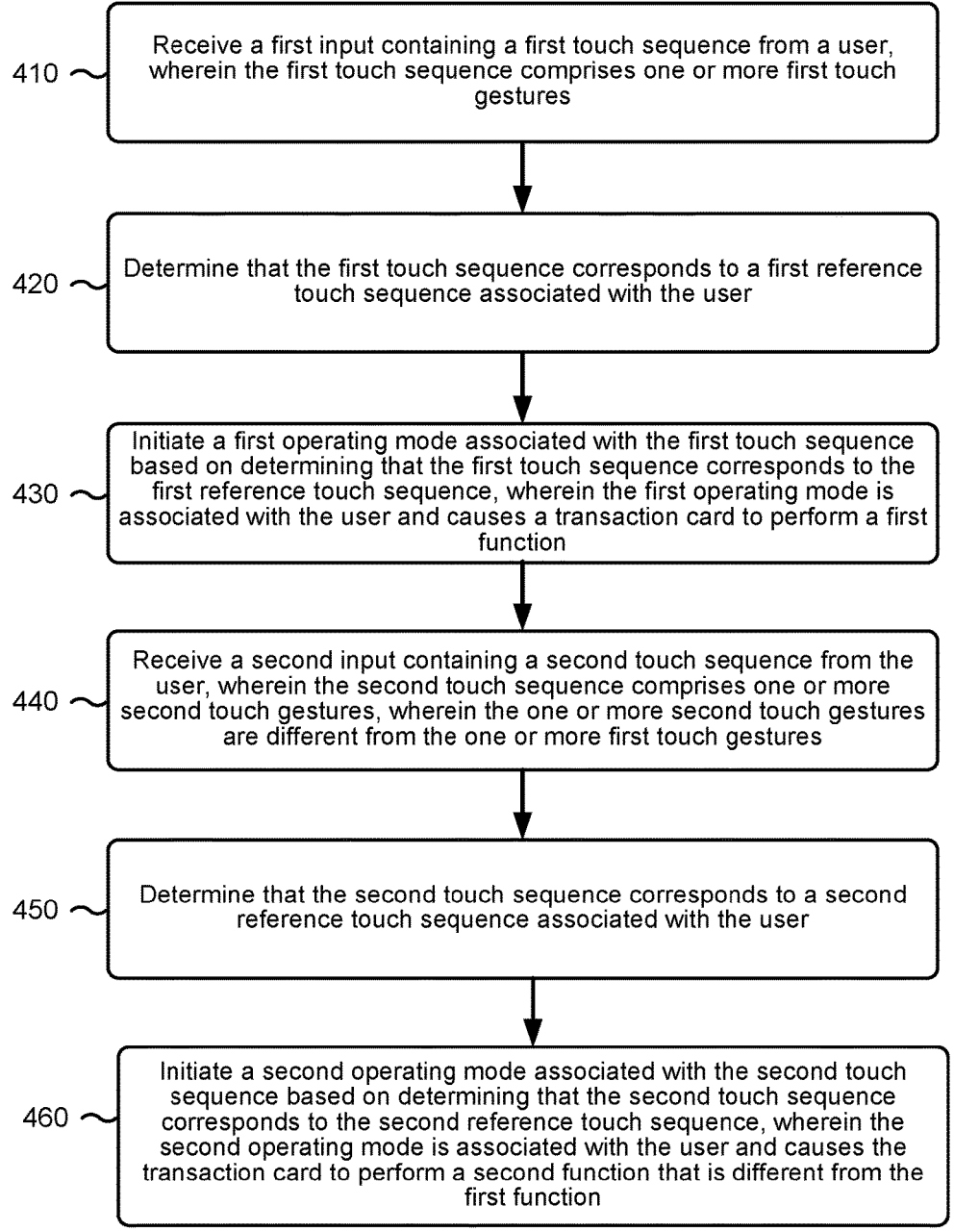
FIG. 4 is a flow chart of an example process for touch authentication of multiple operating modes for a transaction card.

FIG. 4 is a flow chart of an example process 400 for touch authentication of multiple operating modes for a transaction card. In some implementations, one or more process blocks of FIG. 4 may be performed by a transaction card (e.g., transaction card 220), such as a transaction card having one or more sensors associated with one or more processors. In some implementations, one or more process blocks of FIG. 4 may be performed by another device or a group of devices separate from or including the transaction card, such as a user device (e.g., user device 210), a transaction backend device (e.g., transaction backend device 230), a transaction terminal (e.g., transaction terminal 240), and/or the like.

As shown in FIG. 4, process 400 may include receiving a first input containing a first touch sequence from a user, wherein the first touch sequence comprises one or more first touch gestures (block 410). For example, the transaction card (e.g., using processor 320, memory 330, storage component 340, input component 350, communication interface 370, and/or the like) may receive a first input containing a first touch sequence from a user, as described above. In some implementations, the first touch sequence may include one or more first touch gestures.

As further shown in FIG. 4, process 400 may include determining that the first touch sequence corresponds to a first reference touch sequence associated with the user (block 420). For example, the transaction card (e.g., using processor 320, memory 330, storage component 340, and/or the like) may determine that the first touch sequence corresponds to a first reference touch sequence associated with the user, as described above.

As further shown in FIG. 4, process 400 may include initiating a first operating mode associated with the first touch sequence based on determining that the first touch sequence corresponds to the first reference touch sequence, wherein the first operating mode is associated with the user and causes the transaction card to perform a first function (block 430). For example, the transaction card (e.g., using processor 320, memory 330, storage component 340, communication interface 370, and/or the like) may initiate a first operating mode associated with the first touch sequence based on determining that the first touch sequence corresponds to the first reference touch sequence, as described above. In some implementations, the first operating mode may be associated with the user and may cause the transaction card to perform a first function.

As further shown in FIG. 4, process 400 may include receiving a second input containing a second touch sequence from the user, wherein the second touch sequence comprises one or more second touch gestures, and wherein the one or more second touch gestures are different from the one or more first touch gestures (block 440). For example, the transaction card (e.g., using processor 320, memory 330, storage component 340, input component 350, communication interface 370, and/or the like) may receive a second input containing a second touch sequence from the user, as described above. In some implementations, the second touch sequence may include one or more second touch gestures, and the one or more second touch gestures may be different from the one or more first touch gestures.

As further shown in FIG. 4, process 400 may include determining that the second touch sequence corresponds to a second reference touch sequence associated with the user (block 450). For example, the transaction card (e.g., using processor 320, memory 330, storage component 340, and/or the like) may determine that the second touch sequence corresponds to a second reference touch sequence associated with the user, as described above.

As further shown in FIG. 4, process 400 may include initiating a second operating mode associated with the second touch sequence based on determining that the second touch sequence corresponds to the second reference touch sequence, wherein the second operating mode is associated with the user and causes the transaction card to perform a second function that is different from the first function (block 460). For example, the transaction card (e.g., using processor 320, memory 330, storage component 340, communication interface 370, and/or the like) may initiate a second operating mode associated with the second touch sequence based on determining that the second touch sequence corresponds to the second reference touch sequence, as described above. In some implementations, the second operating mode may be associated with the user and may cause the transaction card to perform a second function that is different from the first function.

Process 400 may include additional implementations, such as any single implementation or any combination of implementations described below and/or in connection with one or more other processes described elsewhere herein.

In some implementations, the user may be a first user, and the transaction card may receive a third input containing a third touch sequence from a second user, where the third touch sequence comprises one or more third touch gestures, and where the one or more third touch gestures are different from the one or more first touch gestures and the one or more second touch gestures. Additionally, the transaction cared may determine that the third touch sequence corresponds to a third reference touch sequence associated with the second user and may initiate a third operating mode associated with the third touch sequence, where the third operating mode is associated with the second user and causes the transaction card to perform a third function.

In some implementations, the one or more first touch gestures and the one or more second touch gestures may relate to one or more of: a pressure of a touch, a duration of a touch, a tap, a swipe, a pattern of motion, a rocking touch, or a bending action. In some implementations, the transaction card may lock the transaction card when the first touch sequence does not correspond to the first reference touch sequence and the second touch sequence does not correspond to the second reference touch sequence. In some implementations, the transaction card may trigger an alert to the user when the first touch sequence does not correspond to the first reference touch sequence and the second touch sequence does not correspond to the second reference touch sequence.

In some implementations, a first order of the one or more first touch gestures of the first touch sequence may not need to correspond to a first order of one or more touch gestures of the first reference touch sequence in order for the first touch sequence to correspond to the first reference touch sequence, or a second order of the one or more second touch gestures of the second touch sequence may not need to correspond to a second order of one or more touch gestures of the second reference touch sequence in order for the second touch sequence to correspond to the second reference touch sequence.

In some implementations, the first function and the second function may include a different one of: restricting use of the transaction card to a set of functions associated with the user, allowing transactions associated with the user to be executed by the transaction card, or allowing the transaction card to access an account associated with the user.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
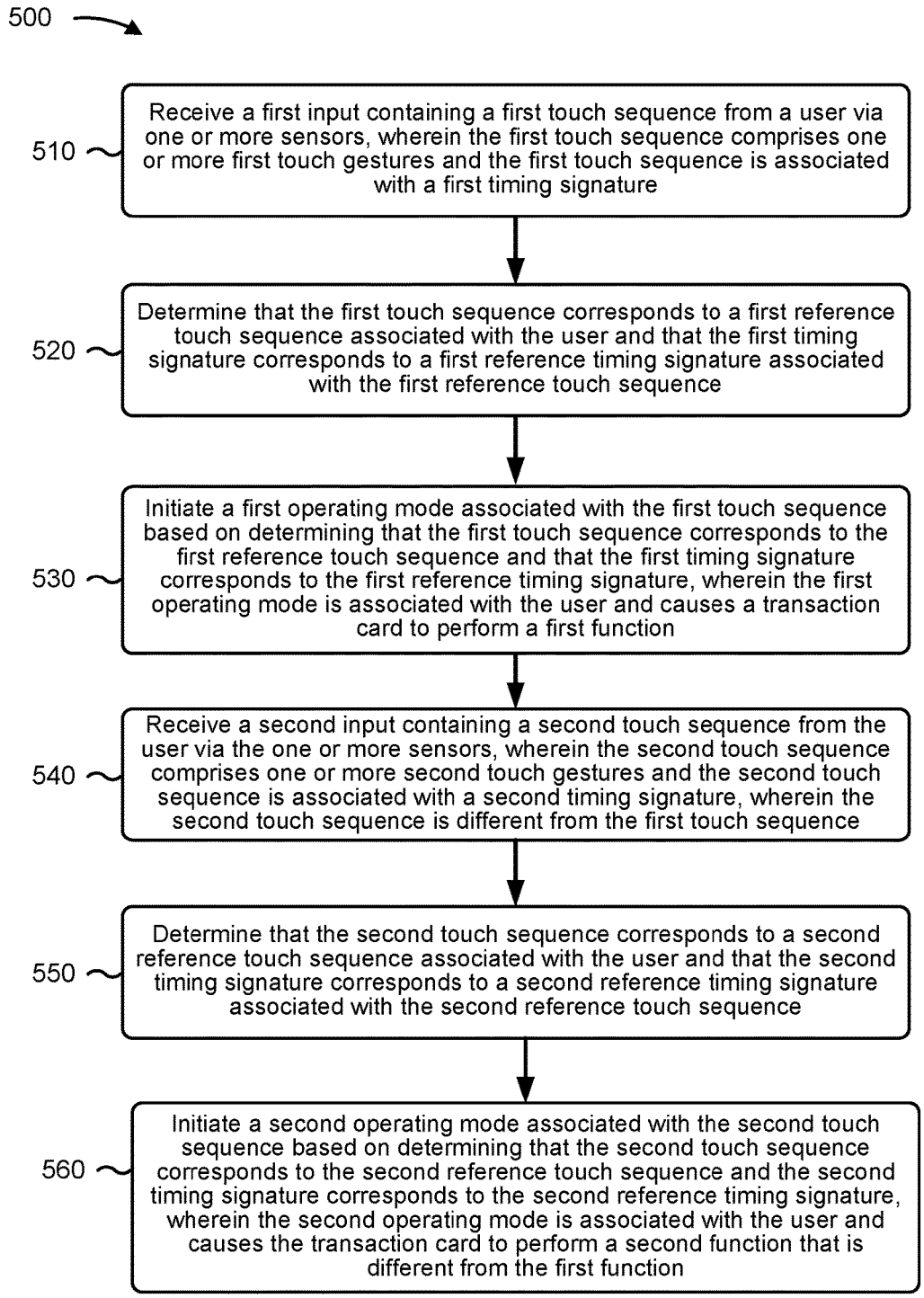
FIG. 5 is a flow chart of an example process for touch authentication of multiple operating modes for a transaction card.

FIG. 5 is a flow chart of an example process 500 for touch authentication of multiple operating modes for a transaction card. In some implementations, one or more process blocks of FIG. 5 may be performed by a transaction card (e.g., transaction card 220), such as a transaction card having one or more sensors associated with one or more processors. In some implementations, one or more process blocks of FIG. 5 may be performed by another device or a group of devices separate from or including the transaction card, such as a user device (e.g., user device 210), a transaction backend device (e.g., transaction backend device 230), a transaction terminal (e.g., transaction terminal 240), and/or the like. In some implementations, the transaction card may include one or more sensors.

As shown in FIG. 5, process 500 may include receiving a first input containing a first touch sequence from a user via the one or more sensors, wherein the first touch sequence comprises one or more first touch gestures and the first touch sequence is associated with a first timing signature (block 510). For example, the transaction card (e.g., using processor 320, memory 330, storage component 340, input component 350, communication interface 370, and/or the like) may receive a first input containing a first touch sequence from a user via the one or more sensors, as described above. In some implementations, the first touch sequence may comprise one or more first touch gestures and the first touch sequence may be associated with a first timing signature.

As further shown in FIG. 5, process 500 may include determining that the first touch sequence corresponds to a first reference touch sequence associated with the user and that the first timing signature corresponds to a first reference timing signature associated with the first reference touch sequence (block 520). For example, the transaction card (e.g., using processor 320, memory 330, storage component 340, and/or the like) may determine that the first touch sequence corresponds to a first reference touch sequence associated with the user and that the first timing signature corresponds to a first reference timing signature associated with the first reference touch sequence, as described above.

As further shown in FIG. 5, process 500 may include initiating, on the transaction card, a first operating mode associated with the first touch sequence based on determining that the first touch sequence corresponds to the first reference touch sequence and that the first timing signature corresponds to the first reference timing signature, wherein the first operating mode is associated with the user and causes the transaction card to perform a first function (block 530). For example, the transaction card (e.g., using processor 320, memory 330, storage component 340, communication interface 370, and/or the like) may initiate, on the transaction card, a first operating mode associated with the first touch sequence based on determining that the first touch sequence corresponds to the first reference touch sequence and that the first timing signature corresponds to the first reference timing signature, as described above. In some implementations, the first operating mode may be associated with the user and may cause the transaction card to perform a first function.

As further shown in FIG. 5, process 500 may include receiving a second input containing a second touch sequence from the user via the one or more sensors, wherein the second touch sequence comprises one or more second touch gestures and the second touch sequence is associated with a second timing signature, and wherein the second touch sequence is different from the first touch sequence (block 540). For example, the transaction card (e.g., using processor 320, memory 330, storage component 340, input component 350, communication interface 370, and/or the like) may receive a second input containing a second touch sequence from the user via the one or more sensors, as described above. In some implementations, the second touch sequence may comprise one or more second touch gestures and the second touch sequence may be associated with a second timing signature. In some implementations, the second touch sequence may be different from the first touch sequence.

As further shown in FIG. 5, process 500 may include determining that the second touch sequence corresponds to a second reference touch sequence associated with the user and that the second timing signature corresponds to a second reference timing signature associated with the second reference touch sequence (block 550). For example, the transaction card (e.g., using processor 320, memory 330, storage component 340, and/or the like) may determine that the second touch sequence corresponds to a second reference touch sequence associated with the user and that the second timing signature corresponds to a second reference timing signature associated with the second reference touch sequence, as described above.

As further shown in FIG. 5, process 500 may include initiating, on the transaction card, a second operating mode associated with the second touch sequence based on determining that the second touch sequence corresponds to the second reference touch sequence and the second timing signature corresponds to the second reference timing signature, wherein the second operating mode is associated with the user and causes the transaction card to perform a second function that is different from the first function (block 560). For example, the transaction card (e.g., using processor 320, memory 330, storage component 340, communication interface 370, and/or the like) may initiate, on the transaction card, a second operating mode associated with the second touch sequence based on determining that the second touch sequence corresponds to the second reference touch sequence and the second timing signature corresponds to the second reference timing signature, as described above. In some implementations, the second operating mode may be associated with the user and may cause the transaction card to perform a second function that is different from the first function.

Process 500 may include additional implementations, such as any single implementation or any combination of implementations described below and/or in connection with one or more other processes described elsewhere herein.

In some implementations, the user may be a first user, and the transaction card may receive a third input containing a third touch sequence from a second user, where the third touch sequence comprises one or more third touch gestures and the third touch sequence is associated with a third timing signature, and where the third touch sequence is different from the first touch sequence and the second touch sequence. Additionally, the transaction card may determine that the third touch sequence corresponds to a third reference touch sequence associated with the second user and that the third timing signature corresponds to a third reference timing signature associated with the third reference touch sequence, and may initiate, on the transaction card, a third operating mode associated with the third touch sequence based on determining that the third touch sequence corresponds to the third reference touch sequence and that the third timing signature corresponds to the third reference timing signature, where the third operating mode is associated with the second user and causes the transaction card to perform a third function that is different from the first function and the second function.

In some implementations, the one or more first touch gestures and the one or more second touch gestures may relate to one or more of: a pressure of a touch, a duration of a touch, a tap, a swipe, a pattern of motion, a rocking touch, or a bending action. In some implementations, the transaction card may comprise a display configured to display an identification number of the transaction card, where the first function or the second function includes toggling the identification number from a visible state to an invisible state or from the visible state to the invisible state.

In some implementations, the first function and the second function may include a different one of: restricting use of the transaction card to a set of functions associated with the user, allowing transactions associated with the user to be executed by the transaction card, or allowing the transaction card to access an account associated with the user. In some implementations, the first timing signature and the second timing signature may relate to one or more of: a pause duration between a first touch gesture and a second touch gesture, or a duration of a touch gesture.

In some implementations, a first order of the one or more first touch gestures of the first touch sequence may need to correspond to a first reference order of one or more touch gestures of the first reference touch sequence in order for the first touch sequence to correspond to the first reference touch sequence, and a second order of the one or more second touch gestures of the second touch sequence may need to correspond to a second reference order of one or more touch gestures of the second reference touch sequence in order for the second touch sequence to correspond to the second reference touch sequence.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
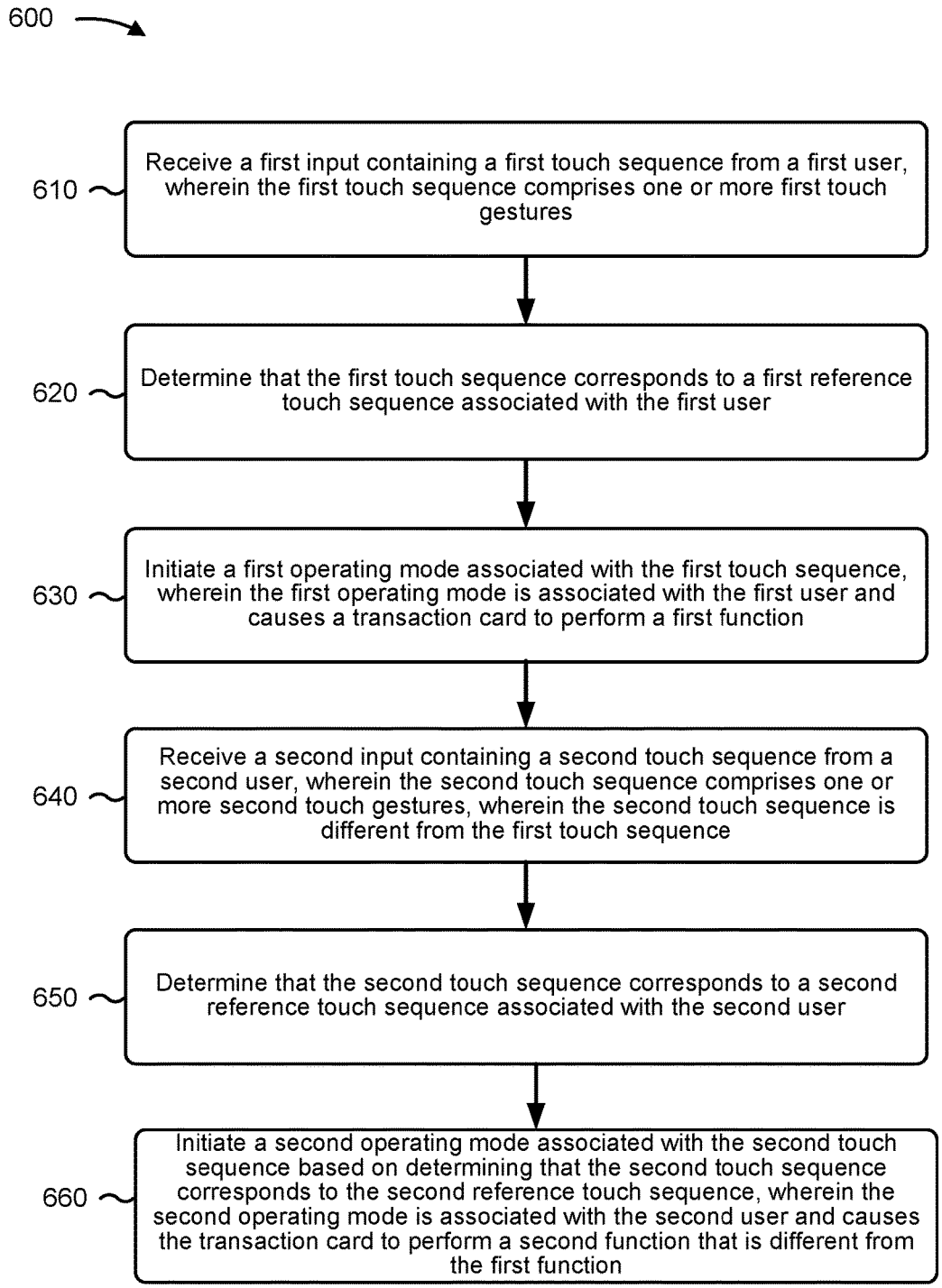
FIG. 6 is a flow chart of an example process for touch authentication of multiple users for a transaction card.

FIG. 6 is a flow chart of an example process 600 for touch authentication of multiple users for a transaction card. In some implementations, one or more process blocks of FIG. 6 may be performed by a transaction card (e.g., transaction card 220), such as a transaction card having one or more sensors associated with one or more processors. In some implementations, one or more process blocks of FIG. 6 may be performed by another device or a group of devices separate from or including the transaction card, such as a user device (e.g., user device 210), a transaction backend device (e.g., transaction backend device 230), a transaction terminal (e.g., transaction terminal 240), and/or the like.

As shown in FIG. 6, process 600 may include receiving, from one or more sensors associated with the transaction card, a first input containing a first touch sequence from a first user, wherein the first touch sequence comprises one or more first touch gestures (block 610). For example, the transaction card (e.g., using processor 320, memory 330, storage component 340, input component 350, communication interface 370, and/or the like) may receive, from one or more sensors associated with the transaction card, a first input containing a first touch sequence from a first user, as described above. In some implementations, the first touch sequence may comprise one or more first touch gestures.

As further shown in FIG. 6, process 600 may include determining that the first touch sequence corresponds to a first reference touch sequence associated with the first user (block 620). For example, the transaction card (e.g., using processor 320, memory 330, storage component 340, and/or the like) may determine that the first touch sequence corresponds to a first reference touch sequence associated with the first user, as described above.

As further shown in FIG. 6, process 600 may include initiating, on the transaction card, a first operating mode associated with the first touch sequence, wherein the first operating mode is associated with the first user and causes the transaction card to perform a first function (block 630). For example, the transaction card (e.g., using processor 320, memory 330, storage component 340, communication interface 370, and/or the like) may initiate, on the transaction card, a first operating mode associated with the first touch sequence, as described above. In some implementations, the first operating mode may be associated with the first user and may cause the transaction card to perform a first function.

As further shown in FIG. 6, process 600 may include receiving, from the one or more sensors associated with the transaction card, a second input containing a second touch sequence from a second user, wherein the second touch sequence comprises one or more second touch gestures, and wherein the second touch sequence is different from the first touch sequence (block 640). For example, the transaction card (e.g., using processor 320, memory 330, storage component 340, input component 350, communication interface 370, and/or the like) may receive, from the one or more sensors associated with the transaction card, a second input containing a second touch sequence from a second user, as described above. In some implementations, the second touch sequence may comprise one or more second touch gestures, and the second touch sequence may be different from the first touch sequence.

As further shown in FIG. 6, process 600 may include determining that the second touch sequence corresponds to a second reference touch sequence associated with the second user (block 650). For example, the transaction card (e.g., using processor 320, memory 330, storage component 340, and/or the like) may determine that the second touch sequence corresponds to a second reference touch sequence associated with the second user, as described above.

As further shown in FIG. 6, process 600 may include initiating, on the transaction card, a second operating mode associated with the second touch sequence based on determining that the second touch sequence corresponds to the second reference touch sequence, wherein the second operating mode is associated with the second user and causes the transaction card to perform a second function that is different from the first function (block 660). For example, the transaction card (e.g., using processor 320, memory 330, storage component 340, communication interface 370, and/or the like) may initiate, on the transaction card, a second operating mode associated with the second touch sequence based on determining that the second touch sequence corresponds to the second reference touch sequence, as described above. In some implementations, the second operating mode may be associated with the second user and may cause the transaction card to perform a second function that is different from the first function.

Process 600 may include additional implementations, such as any single implementation or any combination of implementations described below and/or in connection with one or more other processes described elsewhere herein.

In some implementations, the transaction card may receive a third input containing a third touch sequence from the first user, where the third touch sequence comprises one or more third touch gestures, and where the third touch sequence is different from the first touch sequence and the second touch sequence, and may determine that the third touch sequence corresponds to a third reference touch sequence associated with the first user. Additionally, the transaction card may initiate, on the transaction card, a third operating mode associated with the third touch sequence based on determining that the third touch sequence corresponds to the third reference touch sequence, where the third operating mode is associated with the first user and causes the transaction card to perform a third function that is different from the first function and the second function.

In some implementations, the one or more first touch gestures and the one or more second touch gestures may relate to one or more of: a pressure of a touch, a duration of a touch, a tap, a swipe, a pattern of motion, a rocking touch, or a bending action. In some implementations, the first function may include allowing transactions associated with the first user to be executed by the transaction card, and the second function may include allowing transactions associated with the second user to be executed by the transaction card.

In some implementations, the first touch sequence may be associated with a first timing signature, and a first reference timing signature associated with the first reference touch sequence may correspond to the first timing signature. Additionally, the second touch sequence may be associated with a second timing signature, and a second reference timing signature associated with the second reference touch sequence may correspond to the second timing signature.

In some implementations, the first touch sequence may correspond to one or more first circular shifts of the first reference touch sequence for the first touch sequence to correspond to the first reference touch sequence, or the second touch sequence may correspond to one or more second circular shifts of the second reference touch sequence for the second touch sequence to correspond to the second reference touch sequence.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

Certain user interfaces have been described herein and/or shown in the figures. A user interface may include a graphical user interface, a non-graphical user interface, a text-based user interface, or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
   receiving, by a transaction card having one or more sensors associated with one or more processors, a first input containing a first touch sequence from a user,
      wherein the first touch sequence comprises one or more first touch gestures;
   determining, by the transaction card, that the first touch sequence corresponds to a first reference touch sequence associated with the user;
   initiating, by the transaction card, a first operating mode associated with the first touch sequence based on determining that the first touch sequence corresponds to the first reference touch sequence,
      wherein the first operating mode is associated with the user and causes the transaction card to perform a first function;
   receiving, by the transaction card, a second input containing a second touch sequence from the user,
      wherein the second touch sequence comprises one or more second touch gestures,
         wherein the one or more second touch gestures are different from the one or more first touch gestures;
   determining, by the transaction card, that the second touch sequence corresponds to a second reference touch sequence associated with the user; and
   initiating, by the transaction card, a second operating mode associated with the second touch sequence based on determining that the second touch sequence corresponds to the second reference touch sequence,
      wherein the second operating mode is associated with the user and causes the transaction card to perform a second function that is different from the first function.

2. The method of claim 1, wherein the user is a first user, wherein the method further comprises:
   receiving a third input containing a third touch sequence from a second user,
      wherein the third touch sequence comprises one or more third touch gestures,
         wherein the one or more third touch gestures are different from the one or more first touch gestures and the one or more second touch gestures;
   determining that the third touch sequence corresponds to a third reference touch sequence associated with the second user; and
   initiating a third operating mode associated with the third touch sequence,
      wherein the third operating mode is associated with the second user and causes the transaction card to perform a third function.

3. The method of claim 1, wherein the one or more first touch gestures and the one or more second touch gestures relate to one or more of:
   a pressure of a touch,
   a duration of a touch,
   a tap,
   a swipe,
   a pattern of motion,
   a rocking touch,
   a surface area of a touch,
   an alternating touch,
   a pinching touch,
   a rotating action, or
   a bending action.

4. The method of claim 1, further comprising:
   locking the transaction card when the first touch sequence does not correspond to the first reference touch sequence and the second touch sequence does not correspond to the second reference touch sequence.

5. The method of claim 1, further comprising:
   triggering an alert to the user when the first touch sequence does not correspond to the first reference touch sequence and the second touch sequence does not correspond to the second reference touch sequence.

6. The method of claim 1, wherein a first order of the one or more first touch gestures of the first touch sequence does not need to correspond to a first order of one or more touch gestures of the first reference touch sequence in order for the first touch sequence to correspond to the first reference touch sequence, or a second order of the one or more second touch gestures of the second touch sequence does not need to correspond to a second order of one or more touch gestures of the second reference touch sequence in order for the second touch sequence to correspond to the second reference touch sequence.

7. The method of claim 1, wherein the first function and the second function include a different one of:
   restrict use of the transaction card to a set of functions associated with the user,
   allow transactions associated with the user to be executed by the transaction card, or
   allow the transaction card to access an account associated with the user.

8. A transaction card, comprising:
   one or more sensors;
   one or more memories; and
   one or more processors, communicatively coupled to the one or more sensors and the one or more memories, configured to:
      receive a first input containing a first touch sequence from a user via the one or more sensors,
         wherein the first touch sequence comprises one or more first touch gestures and the first touch sequence is associated with a first timing signature;
      determine that the first touch sequence corresponds to a first reference touch sequence associated with the user and that the first timing signature corresponds to a first reference timing signature associated with the first reference touch sequence;

initiate, on the transaction card, a first operating mode associated with the first touch sequence based on determining that the first touch sequence corresponds to the first reference touch sequence and that the first timing signature corresponds to the first reference timing signature,
wherein the first operating mode is associated with the user and causes the transaction card to perform a first function;

receive a second input containing a second touch sequence from the user via the one or more sensors, wherein the second touch sequence comprises one or more second touch gestures and the second touch sequence is associated with a second timing signature,
wherein the second touch sequence is different from the first touch sequence;

determine that the second touch sequence corresponds to a second reference touch sequence associated with the user and that the second timing signature corresponds to a second reference timing signature associated with the second reference touch sequence; and initiate, on the transaction card, a second operating mode associated with the second touch sequence based on determining that the second touch sequence corresponds to the second reference touch sequence and the second timing signature corresponds to the second reference timing signature,
wherein the second operating mode is associated with the user and causes the transaction card to perform a second function that is different from the first function.

9. The transaction card of claim 8, wherein the user is a first user,
wherein the one or more processors are further to:
receive a third input containing a third touch sequence from a second user,
wherein the third touch sequence comprises one or more third touch gestures and the third touch sequence is associated with a third timing signature,
wherein the third touch sequence is different from the first touch sequence and the second touch sequence;

determine that the third touch sequence corresponds to a third reference touch sequence associated with the second user and that the third timing signature corresponds to a third reference timing signature associated with the third reference touch sequence; and initiate, on the transaction card, a third operating mode associated with the third touch sequence based on determining that the third touch sequence corresponds to the third reference touch sequence and that the third timing signature corresponds to the third reference timing signature,
wherein the third operating mode is associated with the second user and causes the transaction card to perform a third function that is different from the first function and the second function.

10. The transaction card of claim 8, wherein the one or more first touch gestures and the one or more second touch gestures relate to one or more of:
a pressure of a touch,
a duration of a touch,
a tap,
a swipe,
a pattern of motion,
a rocking touch,
a surface area of a touch,
an alternating touch,
a pinching touch,
a rotating action, or
a bending action.

11. The transaction card of claim 8, further comprising a display configured to display an identification number of the transaction card,
wherein the first function or the second function includes toggling the identification number from a visible state to an invisible state or from the visible state and the invisible state.

12. The transaction card of claim 8, wherein the first function and the second function include a different one of:
restrict use of the transaction card to a set of functions associated with the user,
allow transactions associated with the user to be executed by the transaction card, or
allow the transaction card to access an account associated with the user.

13. The transaction card of claim 8, wherein the first timing signature and the second timing signature relate to one or more of:
a pause duration between a first touch gesture and a second touch gesture, or
a duration of a touch gesture.

14. The transaction card of claim 8, wherein a first order of the one or more first touch gestures of the first touch sequence needs to correspond to a first reference order of one or more touch gestures of the first reference touch sequence in order for the first touch sequence to correspond to the first reference touch sequence, and a second order of the one or more second touch gestures of the second touch sequence needs to correspond to a second reference order of one or more touch gestures of the second reference touch sequence in order for the second touch sequence to correspond to the second reference touch sequence.

15. A non-transitory computer-readable medium storing instructions, the instructions comprising:
one or more instructions that, when executed by one or more processors of a transaction card, cause the one or more processors to:
receive, from one or more sensors associated with the transaction card, a first input containing a first touch sequence from a first user,
wherein the first touch sequence comprises one or more first touch gestures;

determine that the first touch sequence corresponds to a first reference touch sequence associated with the first user;

initiate, on the transaction card, a first operating mode associated with the first touch sequence,
wherein the first operating mode is associated with the first user and causes the transaction card to perform a first function;

receive, from the one or more sensors associated with the transaction card, a second input containing a second touch sequence from a second user,
wherein the second touch sequence comprises one or more second touch gestures,
wherein the second touch sequence is different from the first touch sequence;

determine that the second touch sequence corresponds to a second reference touch sequence associated with the second user; and initiate, on the transaction card, a second operating mode associated with the second touch sequence based on determining that the second touch sequence corresponds to the second reference touch sequence,
wherein the second operating mode is associated with the second user and causes the transaction card to perform a second function that is different from the first function.

16. The non-transitory computer-readable medium of claim 15, wherein the one or more instructions, when executed by the one or more processors, further cause the one or more processors to:
receive a third input containing a third touch sequence from the first user,
wherein the third touch sequence comprises one or more third touch gestures,
wherein the third touch sequence is different from the first touch sequence and the second touch sequence;
determine that the third touch sequence corresponds to a third reference touch sequence associated with the first user; and
initiate, on the transaction card, a third operating mode associated with the third touch sequence based on determining that the third touch sequence corresponds to the third reference touch sequence,
wherein the third operating mode is associated with the first user and causes the transaction card to perform a third function that is different from the first function and the second function.

17. The non-transitory computer-readable medium of claim 15, wherein the one or more first touch gestures and the one or more second touch gestures relate to one or more of:
a pressure of a touch,
a duration of a touch,
a tap,
a swipe,
a pattern of motion,
a rocking touch,
a surface area of a touch,
an alternating touch,
a pinching touch,
a rotating action, or
a bending action.

18. The non-transitory computer-readable medium of claim 15, wherein the first function includes allowing transactions associated with the first user to be executed by the transaction card, and the second function includes allowing transactions associated with the second user to be executed by the transaction card.

19. The non-transitory computer-readable medium of claim 15,
wherein the first touch sequence is associated with a first timing signature, and a first reference timing signature associated with the first reference touch sequence corresponds to the first timing signature, and
wherein the second touch sequence is associated with a second timing signature, and a second reference timing signature associated with the second reference touch sequence corresponds to the second timing signature.

20. The non-transitory computer-readable medium of claim 15, wherein the first touch sequence corresponds to one or more first circular shifts of the first reference touch sequence for the first touch sequence to correspond to the first reference touch sequence, or the second touch sequence corresponds to one or more second circular shifts of the second reference touch sequence for the second touch sequence to correspond to the second reference touch sequence.

* * * * *